Patented Feb. 21, 1950

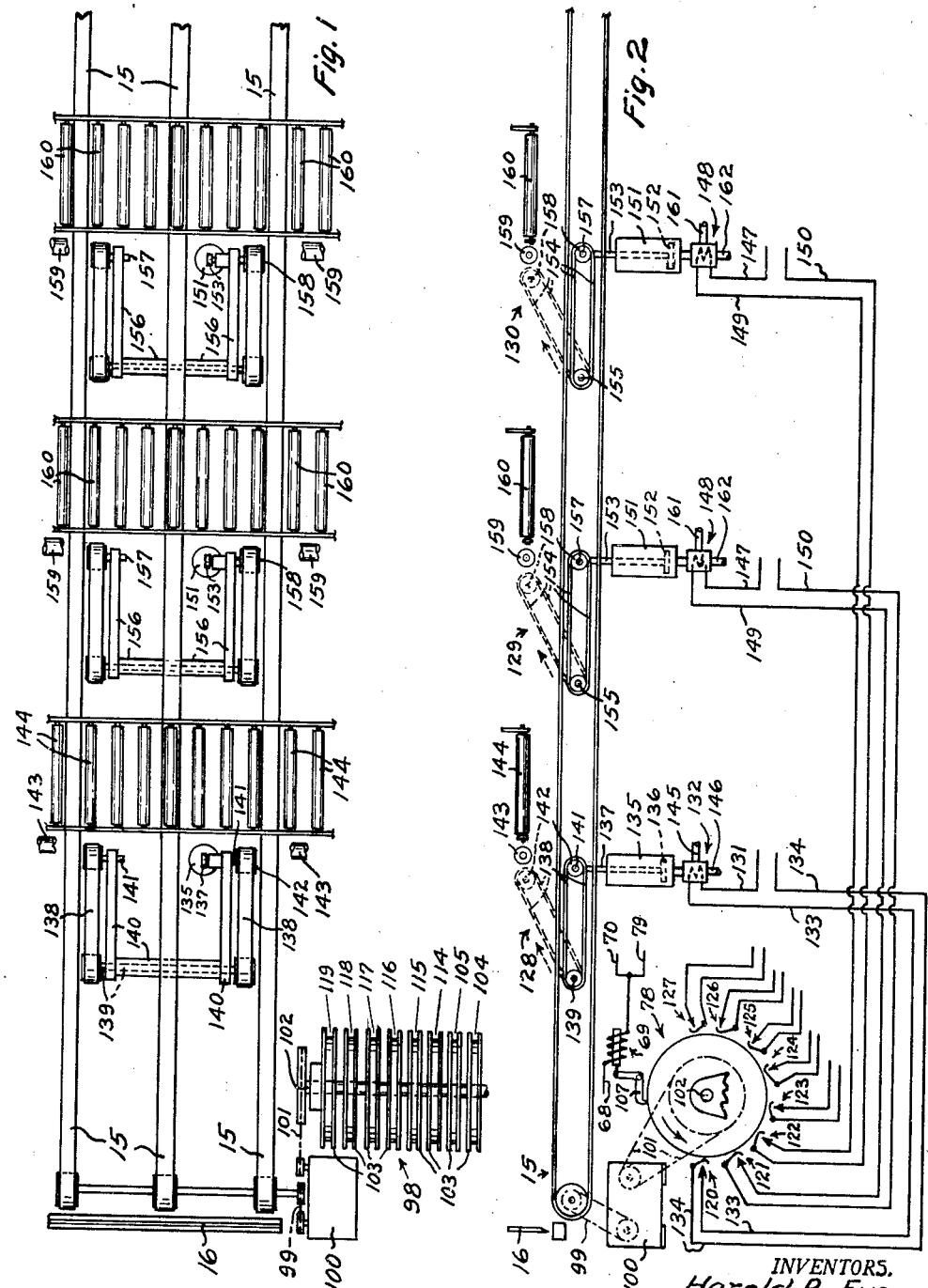

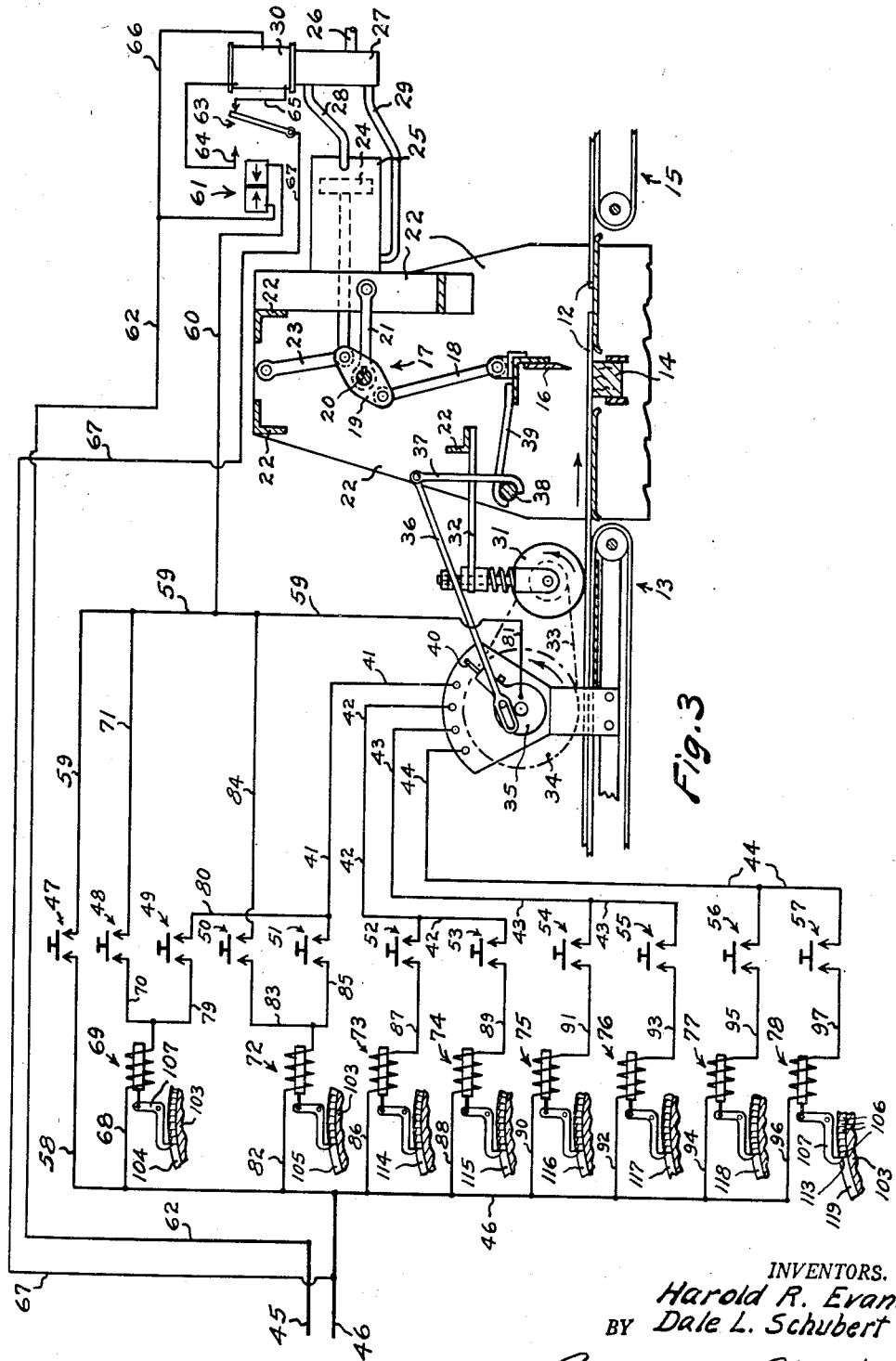

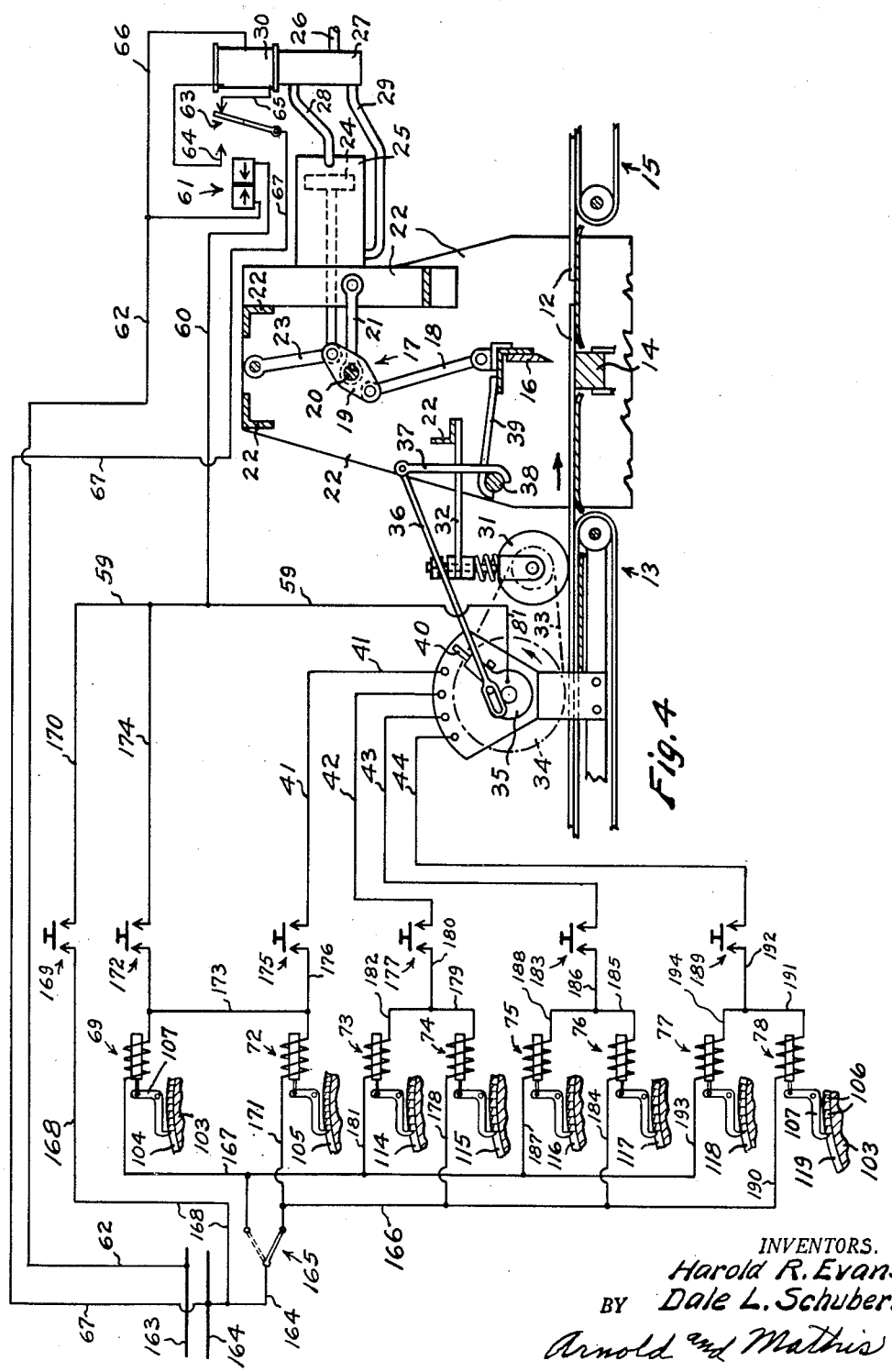

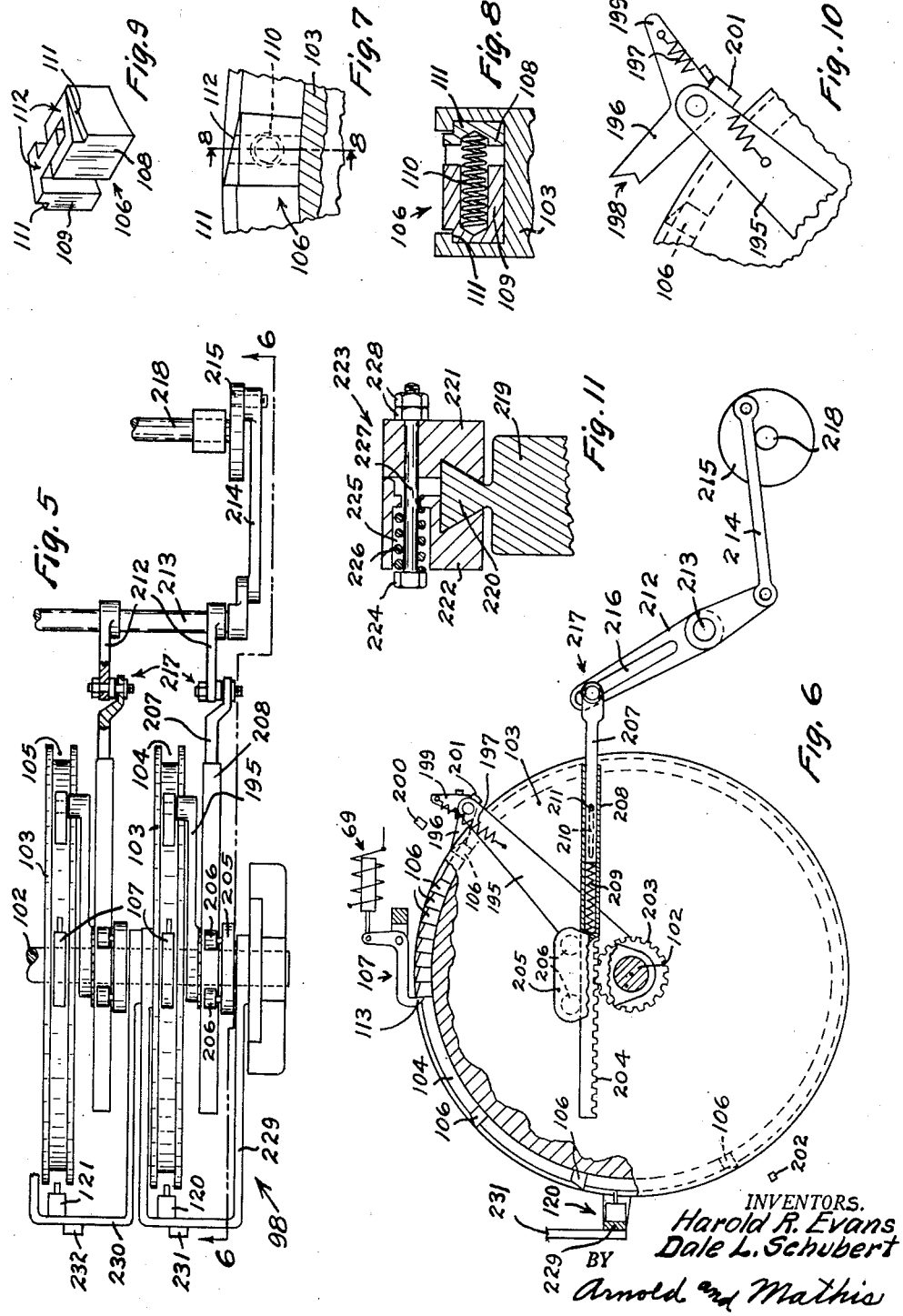

2,497,874

UNITED STATES PATENT OFFICE 2,497,874

MECHANICAL TIME DELAY MECHANISM

Harold R. Evans, Olympia, and Dale L. Schubert, Tacoma, Wash., assignors to Plywood Research Foundation, Tacoma, Wash., a nonprofit corporation of Washington Application August 25, 1947, Serial No. 770,540

15 Claims. (Cl. 214—11)

This invention relates to a mechanical-sorter-selector means. More particularly, this invention relates to a mechanical-sorter-selector means wherein the material, which is of varying sizes and shapes is formed or cut and delivered from the former or cutter, to a common transfer means and is later selected or transferred from the common transfer means in response to an electrical impulse which is controlled by means responsive to the original forming or cutting of the material.

Our invention relates to a mechanical-sorter-selector means which can be employed in many industries. For example, in the lumber mill art, pieces of lumber of varying lengths leave the planer and are delivered onto a common belt or conveyor means. Thereafter, the varying pieces of lumber are selected in accordance with their length and transferred to bins or conveyors so that pieces of lumber of predetermined character reach a common bin or transfer means. Also, in the plaster board art, pieces of material of varying dimension are, at times, formed or delivered to a common transfer means and they must be later selected so that pieces having common characteristics finally reach the same bins or transfer means.

While other arts may be mentioned as fields of environment in which our invention is applicable, the plywood industry is probably the more complex, and it will be obvious that as the invention may be used in such industry, it can be readily adapted to other industries. Thus, as an illustration and not as a limitation of our invention, it will be described in connection with some of its uses in the plywood art.

In clipping the green veneer sheet, it is now common practice to cut or clip the sheet to remove defects and form sheets of standard widths, as less than 13, 26, 39 and 52 inches.

In order to best utilize the veneer stock which is available and to obtain the highest grade products therefrom, it is desirable to produce the widest sheets possible within the predetermined selected maximum.

After the veneer stock has been clipped to provide the most economical and practical size pieces, the pieces are then removed from the outfeed or off-bearing transfer belt in accordance with their particular properties. In other words, heart stock may be separated from sap stock. Also, the various pieces of one kind of stock may be separated according to whether they are usable pieces of stock for making plywood or whether they are scrap. Next, the pieces of stock which are usable for making plywood may be separated according to their widths.

Heretofore, it has been a manual operation to select pieces of stock according to the individual characteristics of the pieces of stock involved. Some of these manually controlled devices have provided transfer systems wherein an operator visually selects the stock and then by means responsive to an electric impulse, the stock is transferred to suitable conveyors, bins, or trucks and the like. Our invention is applicable for controlling such transfer means, and one thereof is known in the art as an "Ederer" machine sold by the Ederer Engineering Company of Seattle, Washington. Other sorters and stackers obviously can be controlled by the sorter-selector means of our invention and others are commonly available on the market. Thus, in the drawings, we have only diagrammatically illustrated the off-bearing conveyor means of the clipper and the transfer means leading to suitable storage bins and the like.

The sorter-selector means of our invention may be mechanically operated by an operator as he visually observes stock on the off-bearing conveyor of the veneer clipper. However, we prefer to interconnect the sorter-selector means with the veneer clipper so that the same operator who clips the stock causes electric impulses to be set in motion after a time delay period, and which electric impulses will later control the operation of the desired sorter means.

One type of veneer clipper which can be electrically interconnected with a sorter-selector means by reason of our invention is that shown in the patent to W. J. Miller et al., No. 2,394,558, issued February 12, 1946. The particular characteristics of the device shown in said Miller patent so involved is that each electrical switch means causes the clipping of pieces of definite size or character.

It is an object of our invention to provide a mechanical time delay system so that any electrically controlled apparatus will respond later at a predetermined time to a starting mechanism. Also, it is an object of our invention to cause an electrical impulse synchronized with an earlier electric impulse and thus have an electrically controlled apparatus, such as a sorter, operating synchronously with but at a later time period as respects the first caused electric impulse.

It is an object of our invention to provide a drum having a trackway and mechanical means which have relative movement as respects said trackway or travel therewith.

It is a further object of our invention to provide a drum having a plurality of relatively movable lugs or pawls which can be spaced or positioned in proportion to the time delay desired.

It is a further object of our invention to provide a drum, which synchronously moves with the off-bearing conveyor means of a clipper and in turn with the clipper, in combination with lugs or pawls relatively movable as respects said drum where the positions of the lugs will bear a definite relation to the action of the clipper.

It is a further object of our invention to mechanically cause time delays in creating electric impulses which delays bear definite relationships to the impulses employed in actuating a veneer clipper.

The above mentioned general objects of this invention together with others inherent in the same are attained by the device illustrated in the accompanying drawings, throughout which like reference numerals indicate like parts.

Figure 1 is a fragmentary, diagrammatic plan view, with some parts removed and some broken away in the interest of clearness, of a device illustrating an embodiment of our invention;

Fig. 2 is a fragmentary diagrammatic view in elevation of the apparatus in Fig. 1, and showing a partial wiring diagram;

Fig. 3 is a fragmentary and somewhat diagrammatic view illustrating mechanical and electrical connections between a veneer clipper and the selector means of this invention;

Fig. 4 is a view similar to Fig. 3 showing a modified form of wiring diagram in connection with the same apparatus indicated in Fig. 3;

Fig. 5 is a fragmentary plan view of the drum and parts associated therewith which are indicated somewhat diagrammatically in Fig. 1;

Fig. 6 is a view partly in section and partly in elevation of the structure shown in Fig. 5;

Fig. 7 is a fragmentary view partly in elevation and partly in section and on a larger scale than Fig. 6 illustrating a form of lugs or pawls of this invention in a mating groove;

Fig. 8 is a sectional view taken substantially on broken line 8—8 of Fig. 7;

Fig. 9 is a detached perspective view of one of said lugs or pawls;

Fig. 10 is a fragmentary view in elevation and on a larger scale showing a portion of the lug return means illustrated in Fig. 6; and Fig. 11 is a fragmentary view partly in section and partly in elevation showing a modified form of lugs or pawls and a track means therefor which may be employed in our invention.

Referring to the drawings, a fragment of a plywood clipper of one type is shown. This clipper is merely illustrative of a clipper which may be used in our invention, and hence, by way of illustration, parts have been, in substance, copied from the Miller patent, No. 2,394,558 and parts have been added.

In Figs. 3 and 4, veneer 12 to be clipped is fed by inbearing conveyor 13, across a die or bed 14, and is removed by out-bearing conveyor 15. The veneer knife 16 moves into and out of cutting position by means of a toggle lever means 17. The knife 16 is disposed to cut through veneer 12 and against bed 14 as veneer 12 is passed across and supported by said bed 14.

Link members 18, one of which is shown in Fig. 3, are connected at one end with the knife 16, and the other end with a lever 19, which lever is fixed on rock shaft 20. This rock shaft 20 angularly moves each time the knife 16 is stroked. The rock shaft 20 angularly moves sufficiently so that the knife 16 strokes through the veneer 12 and then out of the line of travel of the veneer 12.

The rock shaft 20 is pivotally supported by a substantially horizontal arm 21, which arm is pivotally supported by the main frame structure 22 of the clipper. The lever 19 is pivotally connected with a substantially vertical arm 23, which arm 23 is pivotally connected with the main frame structure 22 of the clipper. Thus, upon sufficient angular movement in either direction of the lever 19, the knife 16 will be stroked downwardly through the veneer 12 and thence upwardly out of the path of travel of the veneer 12.

The knife 16 is reciprocated by electrically controlled means such as piston 24 in pneumatic cylinder 25. Air under pressure is supplied through air inlet conduit 26 and valve means 27. The valve means 27 controls the flow of air under pressure to and from cylinder 25 alternately through conduit 28 and out via conduit 29 and through conduit 29 and out conduit 28. The valve 27 is electrically controlled by a double acting solenoid 30.

As one field of the solenoid 30 is energized, conduit 28 becomes as inlet conduit and conduit 29 becomes an outlet conduit. Upon energizing of the other field of solenoid 30, conduit 29 becomes an inlet conduit and conduit 28 becomes an outlet conduit. In the arrangement shown, one or the other of the fields of solenoid 30 is always energized, except during movement of armature 63.

Thus, piston 24 may be moved to the left as respects the showing in Figs. 3 and 4, to stroke the knife 16 through one stroke and for the next subsequent stroke, the piston 24 will be moved to the right.

The foregoing description of the knife means 16 and parts operating to stroke the same are merely illustrative of one practical veneer clipper whose operation is subject to electrical control Thus, obviously the details of the knife and its operating means are merely illustrative to indicate a veneer clipper which has an electric control such as solenoid 30.

As will hereafter appear, the solenoid 30 is operated at determined time intervals and the time interval delay in the operation of solenoid 30 will be in proportion to the width of veneer stock being cut. In other words, there is a direct relation between the time intervals in which solenoid 30 is being operated, and the size of stock which is being obtained and which is to be selected and sorted according to size.

The roll 31 is resiliently mounted on support 32 which in turn is supported by the main frame structure 22. The roll 31 extends transversely of the clipper and the roll 31 rides on and is supported by veneer stock 12. Thus, the peripheral speed of the roll 31 is the same as the lineal speed of the veneer stock on the inbearing conveyor 13. Roll 31 is connected by a link belt 33 with a sheave 34 which in turn is connected through clutch means with rotatably mounted arm 35. The arm 35 is connected with a link 36 which is pivotally connected with another link 37 and said link 37 is secured to rock shaft 38. Rock shaft 38 mounts link 39. Upon release of the clutch mechanism, arm 35 can be returned to the position shown in Fig. 3 of the drawings. As described in detail in said Miller et al., Patent No. 2,394,558, the said arm 35 will return to said position shown in Fig. 3 of the drawings each time the knife 16 is stroked through the linkage indicated. The arm 35 carries a contactor 40. The extent of movement of the contactor 40 in the direction of the arrow has a direct relation to the peripheral speed of roller 31 and to the lineal speed of the veneer 12. The type of cutter mechanism or the control therfor form no part of the present invention and thus in this part of the structure illustrated, we have merely shown a construction wherein an electrical impulse is employed in the actuation of devices to cut material to a given dimension.

The circuits including conductors 41 to 44 inclusive illustrate respectively, circuits electrically controlling the cutting of veneer stock to dimensions as 13", 26", 39", and 52" in width. Obviously, the dimensions predetermined will depend upon standards set in a particular industry.

In Fig. 3, conductors 45 and 46 illustrate any suitable source of electrical energy. The manual control switches 47 to 57 inclusive represent switches controlling predetermined cuts as: scrap; less than 13" usable heart stock; 13" heart stock; less than 13" usable sap cut; 13" sap cut; 26" heart cut; 26" sap cut; 39" heart cut; 39" sap cut; 52" heart cut and 52" sap cut respectively. While separate segregations or selections may be made, the drawings illustrate a construction where the scrap may be delivered to one bin; the heart stock of 13" as well as that less than 13" is delivered to one bin; the sap stock of 13" as well as that of less than 13" is delivered to one bin, and then each dimension heart stock or sap stock of 26" and greater is delivered to a separate bin.

Tracing a circuit including one of the switches 47 to 57 inclusive, energy commences on conductor 46, thence along conductor 58, through closed switch 47 to conductor 59, thence along conductor 60, through relay 61, and thence along conductor 62 to the other side of the line-conductor 45.

Relay 61 is of the type so that it consecutively moves its armature 63 in contact with conductor 64 or 65. In other words, upon energizing of relay 61, the armature 63 is in contact with one of the conductors 64 or 65, as 65. Armature 63 is spring loaded (not shown) and will remain in contact with conductor 65. Upon the next momentary contact energizing relay 61 the armature 63 will move into electrical connection with conductor 64 and remain in contact therewith in view of the spring loading of said armature 63. This alternate sequence of operation will continue each time relay 61 is energized. As the details of relay 61 form no part of the present invention, it is diagrammatically illustrated.

Assuming armature 63 was in contact with conductor 64 and relay 61 is energized by the circuit just described, then armature 63 will move into contact with conductor 65 and we will have the following secondary circuit energizing solenoid 30. This circuit will comprise source of energy 45, conductor 62, conductor 66, through one of the coils of solenoid 30, along conductor 65, along armature 63, along conductor 67, to the other side of the line-conductor 46. In the event that the armature 63 is in the position shown in Fig. 3 of the drawings and relay 61 is energized, then armature 63 will contact conductor 64. Then a circuit will be established through the following: conductor 46, conductor 67, armature 63, conductor 64, the other coil of solenoid 30, conductor 66, conductor 62, and to conductor 45. As the coils of solenoid 30 are alternately energized this will operate valve means 27 and alternately change conduits 28 and 29 as to inlet and outlet conduits and reciprocate piston 24 and in turn stroke the knife 16.

In the event that switch 48 is momentarily closed, energy will pass from conductor 46, along conductor 68, through solenoid 69, along conductor 70, through switch 48, along conductor 71, to conductor 59. As previously described, when energy from conductor 46 is imposed upon conductor 59, this will energize the relay 61 and in turn stroke the knife 16. Thus, upon closing of switch 48, we not only stroke the knife 16 but we energize solenoid 69 and the function resulting from the energizing of solenoid 69 will be hereinafter described. While solenoid 69 is shown in series with a relay 61, obviously the solenoid 69 could be a remotely controlled solenoid embodying a relay and the primary could be in the series circuit rather than the solenoid as illustrated. The solenoids 72 to 78 inclusive are in different circuits but may be identical with the properties described in connection with solenoid 69.

Upon the operation of solenoid 69, time relay means are set in motion to later select and remove from a common transfer means stock which has been cut by reason of the operation of switch means 48. In the present instance, switch 48 is to be operated when heart wood is being cut to a dimension of less than 13" and is usable stock.

Manual operated switch 49 is designed to be operated when heart stock having a width of 13" is being cut. The circuit involving switch 49 comprises conductor 46, conductor 68, solenoid 69, conductor 79, switch 49, conductor 80, conductor 41, contactor 40, and conductor 81, connected with contactor 40. Energy on conductor 81 is transmitted to conductor 59. As previously mentioned, when energy from conductor 46 is impressed on conductor 59, relay 61 will be operated which will, through the circuits described, stroke knife 16. The contactor 40 moves in the direction of the arrow, counter-clockwise and the contactor 40 will not register with the conductor 41 until 13" of stock has passed from the last cut so that upon registration of the contactor 40 with the conductor 41, the knife 16 will be stroked to cut exactly 13" of stock. At the same time, the solenoid 69 is energized and thus, if this selection is desired, heart stock of 13" or usable heart stock of less than 13" will be selected by the mechanism hereinafter described which is responsive to energizing of solenoid 69.

The switches 47, 48 and 50 are of the momentary contact type, while switches 49 and 51 to 57 inclusive are moved in contact and will remain in contact until the knife 16 is stroked in response thereto.

The switch 50 is designed for use in cutting sap stock of a width less than 13". The circuit including said switch comprises conductor 46, conductor 82, solenoid 72, conductor 83, switch 50, conductor 84 and thence to conductor 59. As previously explained, when energy from conductor 46 is impressed upon conductor 59, this will energize relay 61 and thus the structure described will stroke knife 16.

The switch 51 is designed to cut 13" sap stock. The circuit including said switch comprises conductor 46, conductor 82, solenoid 72, conductor 85, switch 51, conductor 41, contactor 40, conductor 81 and conductor 59. By impressing voltage from conductor 46 on conductor 59, it will be obvious that knife 16 will be stroked and the width of the cut will be 13" as the conductor 41 is employed in the circuit. As solenoid 72 is energized in the same circuit of either switch 50 or switch 51, 13" sap wood and sap wood of less than 13" will be sorted by the same means controlled by solenoid 72.

Switch 52 is designed to cut 26" heart stock and to control the solenoid 73 and in turn, the selector means operated in response to said solenoid 73. The circuit including switch 52, comprises conductor 46, conductor 86, solenoid 73, conductor 87, switch 52, conductor 42, contactor 40, conductor 81 and thence to conductor 59. The contactor 40 is designed to move into registration with conductor 42 when 26" of stock is passed under knife 16. Thus, upon closing of switch 52, the knife will cut 26" of stock and energize solenoid 73.

In view of the detailed description given in view of previous solenoids and switches, the description of the remaining solenoids and switches will be somewhat abbreviated.

Switch 53 is for 26" sap stock and its circuit comprises conductor 46, conductor 88, solenoid 74, conductor 89, switch 53, conductor 42, contactor 40 and conductor 81 to conductor 59.

The switch 54 is for 39" heart stock and its circuit comprises conductor 46, conductor 90, solenoid 75, conductor 91, switch 54, conductor 43, contactor 40, conductor 81 to conductor 59. The contactor 40 will be in registration with conductor 43 when 39" of stock are being cut by the knife 16.

The switch 55 is for cutting 39" of sap stock and its circuit comprises conductor 46, conductor 92, solenoid 76, conductor 93, switch 55, and to conductor 43, which was described in connection with switch 54.

The switch 56 is for cutting 52" heart stock and its circuit comprises conductor 46, conductor 94, solenoid 77, conductor 95, switch 56, conductor 44, contactor 40, conductor 81, to conductor 59.

The switch 57 is for cutting 52" sap stock and its circuit comprises conductor 46, conductor 96, solenoid 78, conductor 97, switch 57 and to conductor 44 which was described in connection with circuit comprising switch 56.

In order to somewhat shorten the description, and without completing each circuit, some of the circuits have been traced completely and others will appear obvious from what has been stated. In a summary way, it will appear that certain of the solenoids 69 and 72 to 78 inclusive will be energized when circuits are completed therethrough by certain of the switches 47 to 57 inclusive.

Upon energizing of any of the solenoids 69 or 72 to 78 inclusive, mechanical means are set in motion to provide for a delayed electrical impulse to operate the selector means. This selector means comprises a drum-like assembly 98 shown somewhat diagrammatically in Figs. 1 and 2 and shown more in detail in Figs. 5 to 10 inclusive. In Figs. 1 and 2 fragments of the knife 16 and out-bearing conveyor 15 are shown to correlate the parts shown in Figs. 1 and 2 with those shown and described in connection with Figs. 3 and 4. As indicated in Figs. 1 and 2, the drum assembly 98 is connected for synchronous movement with the out-bearing conveyor 15 by means of a link belt 99, gear reduction means 100, and link belt 101. Generally, the out-bearing conveyor 15 employed in connection with veneer clippers operates at a somewhat accelerated speed over the in-bearing conveyor 13. However, they are proportionately related and it is to be understood that the drum assembly 98 of our invention may be connected with the in-bearing conveyor 13 or with the out-bearing conveyor 15 with appropriate speed changing means. Preferably, the drum assembly 98 is connected with out-bearing conveyor 15 so they must always be operated at the same time.

Referring to Figs. 5 to 10, inclusive, the drum assembly 98 preferably comprises a driven shaft 102 which supports a plurality of groove forming wheels 103. While in Fig. 5 the groove forming wheels are shown as individual units, yet they may be grooves in the same drum but advantages result in a lug return mechanism (hereinafter described) in the construction illustrated.

In Fig. 5, the groove of one wheel 103 is numbered 104 and the groove of the other wheel shown is numbered 105. In each of the grooves there will be disposed the lugs or pawls, a form of which is shown detached in Fig. 9, and which are numbered generally 106. The lugs or pawls 106 in one of the groove forming wheels 103 will be functionally related to switch mechanisms in a circuit involving only one of the solenoids 69, or 72 to 78 inclusive. Thus, there will be as many grooves similar to 104 or 105 as there will be solenoids 69, and 72 to 78 inclusive and parts associated therewith as are employed. For purpose of illustration, it will be assumed that groove 104 is associated with solenoid 69 and groove 105 is associated with solenoid 72 and the number 103, 104 and 105 are so applied in Figs. 3, 4, 5 and 6 of the drawings. However, there will be a groove of a similar character associated with each of the said solenoids 69 and 72 to 78 inclusive.

The lugs or pawls 106 are frictionally supported by the wheels 103 and in the preferred form, as best shown in Figs. 7 to 9 inclusive, in a groove in each wheel 103. The wheels 103 will carry the lugs or pawls 106 unless said lugs are restrained.

A means of restraining said lugs is to employ a catch 107 for each groove, which catch normally is in a restraining position, either spring loaded or by gravity, and which catch is electrically released. The electrical release for the catch 107, which is employed in connection with the groove 104 and lugs 106 therein, includes the solenoid 69. Each time the solenoid 69 is energized the catch portion of 107 will be moved upwardly. Solenoid 69 is only momentarily energized and thus the catch portion of 107 will only release its catch or holding action momentarily so only one pawl 106 is released and permitted to travel with the wheel 103 upon each energizing of the solenoid 69. In Fig. 6, however, we have indicated three lugs 106 which have been released and permitted to travel with the wheel 103 and have shown a number of lugs 106 which are being restrained by the catch 107 and there is thus relative movement between the restrained lugs 106 and the wheel 103. As the travel of each of the wheels 103 bears a direct relation to the speed of the out-bearing belt 15, there is a definite relation between the spacing of lugs 106 in any of the grooves and the lineal distance that the out-bearing conveyor 15 has traveled.

The form of lugs 106 is best shown in Figs. 7 to 9 inclusive and comprises mated portions 108 and 109. Spring 110 urges the portions 108 and 109 away from each other. Each of the portions 108 and 109 carries a shouldered end portion 111 and such shouldered portions fit in a recess in a wheel 103. The top and bottom surfaces of the shouldered portions 111 are a portion of an arc having the same diameter of the arc of the groove involved, such as groove 104. Also, preferably the forward and trailing end faces of the portions 108 and 109 are cut on a line which is the same as the radius of the circular grooves, one of which is 104. The upper surface provided by the two portions 108 and 109 of the lug 106 is at an angle as is best shown in Fig. 7, and such angular surface is numbered 112. As the catch portion 113 of any of the catches 107 is raised momentarily and then dropped, such portion 113 will ride down the inclined portion 112 of one of the lugs 106 and always restrain the next following lug 106. The purpose of the shoulders 111 is to maintain the lugs 106 in a groove. The spring 110 will have a suitable tension so that a number thereof can be restrained by catch 107 and yet will have sufficient frictional engagement with a groove so as to operate switch means hereinafter described.

Referring now to Figs. 1 and 2 of the drawings, there will be the same number of grooves in the drum assembly 98 as there will be solenoids of the character of 69 and 72 to 78 inclusive. As eight of said solenoids are shown there will be eight grooves in the drum assembly 98, which grooves are numbered 104 and 105 and 114 to 119 inclusive. Each groove 104, 105 and 114 to 119 inclusive has a plurality of pawls 106 therein and the showing of each groove and its pawls will be the same as that illustrated in Fig. 6 for the groove 104 and its pawls 106.

Also, there will be a switch mechanism operable by the pawls in each groove, which switch mechanism is diagrammatically illustrated in Fig. 2. The switch mechanisms for the grooves 104, 105 and 114 to 119 inclusive are numbered respectively 120 to 127 inclusive.

The switch means 120 to 127 inclusive are somewhat diagrammatically illustrated by their spacing as far as the periphery of the drum assembly 98 is concerned and will correspond to the spacing of the transfer means controlled by them. There will be one transfer means controlled by each of the switches, but only the transfer means controlled by switches 120, 121 and 122 are shown in Fig. 2, and the others have been broken away. As the peripheral speed of the drum assembly 98 has a direct relation to the lineal speed of the out-bearing belt 15, the space between the catch portion 113 of the catch 107 which is associated with the lugs 106 in the groove 104 and the switch 120 will bear a definite relation to the position of the transfer means 128. The time in which it will take a lug 106 in the groove 104 to travel, after being released, and operate the switch 120 will be the same time as it takes a piece of veneer to travel to the transfer means 128. Thus, as the switches 48 and 49 are operated, they will release lugs in grooves 104 and at a delayed time afterwards, calculated in relation to the spacing of the transfer means 128 as respects the knife 16, these lugs 106 will operate a switch means 120. Similarly, as lugs 106 are released in the groove 105 by reason of operation of switches 50 or 51, they will operate switch 121 and the time delay will be the same time delay that is required for veneer stock to travel on the out-bearing belt 15 from the cutter knife 16 to the transfer means 129. Again, when lugs are released in the groove 114, by action of switch 52, they will operate switch 122 and at a time delay which is the same as that required for veneer stock to travel on the out-bearing belt 15 to the transfer means 130. The remaining switches 123 to 127 inclusive will have their circuits and will be associated with transfer means similar to transfers 128 to 130 inclusive. The spacing of the switches 123 to 127 inclusive around the periphery of the drum assembly 98 will be such to provide time delay equal to the time delay required to transfer the veneer stock on the out-bearing conveyor 15 to the location of the transfer means associated with said switches. It will be noted that no solenoid (similar to 69) is in the circuit operated by switch 47 (see Fig. 3) and thus material cut by the operation of switch 47 will go over the end of out-bearing conveyor 15. This provides for an additional selection without the necessity of providing additional transfer means such as that illustrated by 128, 129 and 130. The circuit controlled by the lugs in groove 104 (see Fig. 2) comprises one conductor 131, connected to a source of energy, solenoid controlled valve means 132, conductor 133, switch 120 and conductor 134 connected to said source of electrical energy.

Our invention is not limited to a particular type of transfer means and thus transfer means 128 to 130 inclusive are to be considered as illustrative and hence they are somewhat diagrammatically shown. As so shown, an air cylinder 135 is provided with a traveling piston 136. Upon energizing of solenoid in valve means 132, the rod 137 moves upwardly. The transfer means 128 comprises a plurality of driven belts 138, which are driven from any suitable source (not shown). A cross-shaft 139 mounts a frame structure 140 for pivotal movement. The frame structure 140 supports shafts 141 which in turn support rolls 142. The free end of the frame structure 140 is raised upon energizing of the solenoid of valve means 132, through piston 136, rod 137, and frame structure 140. Then veneer stock on out-bearing conveyor 15 will rise up belts 138 and engage transverse live roll 143 (only the end fragments being shown in Fig. 1) and thence be transferred to the live rolls 144 and thence to any suitable location. The source of power to drive live rolls 143 and 144 is not shown. The piston 136 and parts connected therewith are raised and lowered respectively by air under pressure entering inlet conduit 145 and leaving outlet conduit 146. The piston 136 is held in raised portion for a time period sufficient so that the live roll 143 will control the movement of the piece of veneer and insure that such a piece will be delivered to the live rolls 144. When the live roll 143 has control of the piece of veneer stock, then the piston 136 and parts connected therewith will be lowered. Thus, if the next following piece of stock is one which is to be transferred by a subsequent transfer means in the line of travel of the out-bearing conveyor 15, the transfer means 128 will be lowered at a time period and be out of transfer relation as to pieces of veneer stock which it is not to transfer. One way of controlling the time interval of energizing of solenoid controlled valve 132, is to control the relative length of the face 112 of the lugs 106 and the contact area of the switches 120 to 127 inclusive. As the transfer belts 138 work between the belts of the out-bearing conveyor 15, the free end of such belts can be raised or lowered. Also, if a piece of veneer stock is being transferred by the belts 138, the next piece of veneer can travel part way up the belts 138 when they are raised, and then said belts can be moved downwardly (from the dotted line position to the full line position in Fig. 2) before the piece contacts live roll 143. The next following piece will pass under live rolls 143 and 144 and continue to the transfer means which are to transfer the same off the out-bearing conveyor 15.

Each time that the solenoid 69 is energized, a lug will be released and will travel with the wheel 103 which has the groove 104 therein. As each lug passes the switch 120, the switch 120 will be energized sufficiently long to permit transfer of the piece off the conveyor 15. In this instance we have assumed that we are transferring 13" of heart stock or usable heart stock less than 13" to the live roll 143. After each transfer, the transfer means 128 is lowered to let the pieces of stock of other sizes move along the out-bearing conveyor until they reach a predetermined and selected transfer means.

As to the shorter stock (for example 13" or less than 13") a pusher type of ejector means may be employed to eject the stock transversely from the out-bearing conveyor 15, as such ejector means will be more rapid in operation than the transfer means illustrated. However, in any event, as long as we provide the electrical circuit of our invention, the same may be employed to control any desired type of transfer means. As the out-bearing conveyor 15 travels at an accelerated speed as respects the in-bearing conveyor 13, the pieces will be separated from each other on the out-bearing conveyor 15.

The means to control the transfer means 129 is the same as that described in connection with the control of the transfer means 128 except that the same is controlled by a switch 121 which in turn is controlled by lugs in the groove 105. A similar change is true of the subsequent transfer means as 130, and the control means for the transfer means 130 is controlled by the lugs in the groove 114 and the switch 122. It is felt that it would serve no useful purpose in showing the transfer means and the circuits involved which involve switches 123 to 127 inclusive, and hence the same have not been illustrated and described.

As to transfer means 129 and 130, the parts correspond to the parts described in connection with the transfer means 128 and have the numbers and correspond as will be now indicated.

In connection with transfer means 129 and 130, as respects transfer means 128, conductor 147 corresponds to conductor 131; valve means 148 to valve means 132; conductors 149 to conductor 133; conductors 150 to conductor 134.

As previously stated, the switches 121 and 122 operate in grooves 105 and 114 respectively and release lugs 106 in response to energizing of solenoids 72 and 73. Also, air cylinders 151 correspond to air cylinder 135; pistons 152 to pistons 136; rods 153 to rod 137; belts 154 to belt 138; cross shafts 155 to cross shaft 139; frame structures 156 to frame structure 140; shafts 157 to shafts 141; rolls 158 to rolls 142; live rolls 159 to live roll 143; live rolls 160 to live rolls 144; inlet conduits 161 to inlet conduit 145; and exhaust conduits 162 to exhaust conduit 146. From such corresponding parts and their inherent mode of operation, obviously the transfer means 129 and 130 will be respectively operated each time a lug 106 in grooves 105 and 114 contact respectively switches 121 and 122. The operation of switch 121 will be responsive to switches 50 or 51 which provide 13" sap stock or sap stock of less than 13" and operation of switch 122 will be responsive to switch 52 indicating cutting of 26" heart stock.

Upon operation of the remaining switches 53 to 57 inclusive, operation of appropriate transfer means will be had. In providing for nine selections (including operation of switch 47 where scrap goes over the end of out-bearing conveyor 15) we have provided for more selections than are often made in plywood plants. However, it is obvious that more or less selections than those for which we have made provision can be readily obtained.

Referring now to Fig. 4, we have illustrated a wiring diagram with the object in mind of reducing the number of switches. The switches shown in Fig. 4 will replace the switches 47 to 57 of Fig. 3. In physical arrangement, the switches 47 to 57 of Fig. 3 preferably are in two banks or rows and one row will be used when cutting heart stock and the other row will be used when cutting sap stock.

As the veneer is peeled from a log, it will start out as sap stock and then depending upon how true the log is chucked and the character of the log there will be intermittent heart and sap stock and then the balance will be heart stock. Thus, the operator in clipping such a veneer sheet will be working, for the most part, on either heart or sap stock with some alternate clipping of both types of stock.

In Fig. 4 instead of having a switch to clip each dimension of heart stock and each dimension of sap stock, we have one switch to clip each dimension and an additional switch, as a foot pedal operated switch, to differentiate in the selection of whether heart or core stock is being clipped.

In Fig. 4, the parts which may be identical with and have the same function as the parts described in Fig. 3 will be given the same numbers and not further described, except where it is necessary to better understand the wiring diagram of Fig. 4. Thus, upon energizing of solenoids 69 and 72 to 78 inclusive, the same operations will obtain as described in connection with Fig. 3. In Fig. 4, conductors 163 and 164 represent a source of electrical energy. Switch mechanism 165 is of the type where we have one inlet terminal and two outlet terminals and the switch blade mechanism is always in contact between one inlet terminal and one or the other of the two outlet terminals. This switch 165 can be a foot operated switch so that when depressed by the operator (then in full line position shown in Fig. 4) sap stock will be cut or when released by the operator, the switch will assume the dotted line position and the operator will be cutting heart stock. The conductor 163 is connected to conductor 62 as the conductor 62 and parts connected therewith are identical in Figs. 3 and 4. Conductor 164 leads to switch 165 and is connected by switch 165 to either conductor 166 or conductor 167, depending upon the position of the switch blade in switch 165. Energy on conductor 164, similar to energy on conductor 46 of Fig. 3, leads to conductor 67 and parts connected therewith. Also, energy on conductor 164 leads to conductor 168 through switch 169 and thence on conductor 170 to conductor 59. The conductor 59 and parts thereafter connected with it are the same in either Figs. 3 or 4, and hence have the same number. Upon operation of switch 169, the operator will be cutting scrap and obtains the same results as are obtained in connection with operation of switch 47 of Fig. 3.

Assuming that the switch blade 165 is in the full line position of Fig. 4, then energy will be on conductor 166 and will pass to conductor 171. In the event that switch 172 is depressed, then the energy on conductor 171 will pass through solenoid 72, thence along conductor 173, through closed switch 172 and thence along conductor 174 to conductor 59. Closing of switch 172, when switch 165 is in its full line position, will bring the same results as the closing of switch 50 of Fig. 3 and the operator will be cutting sap stock of less than 13" wide.

When the switch 165 is moved to its dotted line position, conductor 167 will be energized. If switch 172 is depressed, then energy will pass from conductor 167 through solenoid 69, through closed switch 172 and along conductor 174 to conductor 59. Closing of switch 172, when blade 165 is in its dotted line position, will bring the same results as the closing of the switch 48 of Fig. 3 and the operator will be cutting heart stock of less than 13" wide.

When the switch blade 165 is in its full line position, and switch 175 is depressed, conductor 166 will be energized. Energy will pass from conductor 166 to conductor 171, through solenoid 72, along conductor 176, through switch 175 to conductor 41. As explained in connection with Fig. 3, when conductor 41 is energized, a 13" clip is obtained. As solenoid 72 is also energized, the material will be transferred to the transfer means for handling 13" or less than 13" sap stock.

When the switch 165 is moved to the dotted line position shown in Fig. 4, then conductor 167 will be energized, and if switch 175 is depressed or closed, then energy from conductor 167 will pass through solenoid 69, along conductor 173, along conductor 176, through closed switch 175, and to conductor 41.

When conductor 41 is energized, a 13" clip is being made and when solenoid 69 is also energized, the clip will be a 13" piece of heart stock and delivered to the proper transfer means.

When switch 165 is in the full line position and switch 177 is closed, then energy from conductor 166 will pass along conductor 178, through solenoid 74, along conductor 179, along conductor 180, through closed switch 177 to conductor 42. As explained in connection with Fig. 3, when conductor 42 is energized, a 26" clip is provided. Also, as explained in connection with Fig. 3, when solenoid 74 is also energized, then the material being cut is sap stock.

When the switch 165 is moved to the dotted line position in Fig. 4, conductor 167 is energized. If switch 177 is closed, then energy from conductor 167 will pass along conductor 181 through solenoid 73, to conductor 182, thence along conductor 180, through closed switch 177, to conductor 42. When conductor 42 is energized, a 26" cut is being made. As explained in connection with Fig. 3, when solenoid 73 is also energized, then 26" heart stock is being cut and will be appropriately transferred off the out-bearing conveyor means 15.

When switch 165 is in the full line position, then conductor 166 will be energized. When switch 183 is closed, then energy from conductor 166 will pass to conductor 184, through solenoid 76, along conductor 185, along conductor 186, through switch 183, to conductor 43. As explained in connection with Fig. 3, when conductor 43 is energized, a 39" cut is being made. Also, as explained in Fig. 3, when solenoid 76 is also energized, a 39" piece of sap stock is being cut to be appropriately later transferred from the outbearing conveyor 15.

When the blade of the switch 165 is in the dotted line position of Fig. 4, then conductor 167 will be energized. Upon closing of switch 183, then energy from conductor 167 will pass along conductor 187, through solenoid 75, along conductor 188, along conductor 186, through closed switch 183, and to conductor 43. When conductor 43 is energized, we are cutting a 39" piece and when solenoid 75 also is energized, we are cutting a 39" piece of heart stock and such piece of material will be later properly transferred from the out-bearing conveyor belt 15.

When switch 165 is in the full line position, then conductor 166 will be energized. If switch 189 is closed, then energy on conductor 166 will pass to conductor 190, through solenoid 78, to conductor 191, along conductor 192, through closed switch 189, to conductor 44. When conductor 44 is energized, as explained in connection with Fig. 3, we are cutting a 52" piece. Also, as explained in connection with Fig. 3, when solenoid 78 is also energized, we are cutting a piece of 52" sap stock. Thus, the piece cut will be appropriately later removed from the out-bearing conveyor means 15.

Upon moving the switch blade of switch 165 to the dotted line position in Fig. 4, conductor 167 will be energized and the energy thereon will pass to conductor 193, through solenoid 77, along conductor 194, to conductor 192, through closed switch 189, to conductor 44. When conductor 44 is energized, we are cutting a 52" piece as explained in connection with Fig. 3 and when solenoid 77 is also energized, we are cutting a 52" piece of heart stock. Thus, the material will be later properly transferred from the out-bearing conveyor means 15.

In both Figs. 3 and 4, we have shown the relay 61 and the various solenoids 69 and 72 to 78 inclusive in series. Obviously, the solenoids 69 and 72 to 78 inclusive could be controlled by relay and the primary of the relay be in the series circuit. Also, the said relay 61 and the various solenoids 69 and 72 to 78 inclusive could be in parallel circuits. The type of circuit is not particularly important here, and the important feature is that, whenever any of the conductors 41 to 44 inclusive is energized, appropriate solenoids having the function of a solenoid like 69 shall be energized. Also, it is important in our invention that if a switch such as 48, 50 or 172 is operated, that simultaneously therewith a relay having the function of relay 61 is operated and also solenoid bringing about the functions of either solenoid 69 or 72 is operated.

Referring now to Fig. 6 of the drawings, it will be apparent that the peripheral distance, in a counter clock-wise direction, in the groove 104 between the catch portion 113 of the catch 107 and the switch means 120, has a direct relation to the lineal travel of the outbearing conveyor 15 (Fig. 2) between the knife means 16 and the transfer means 128. In such peripheral distance, there may be a great number of lugs 106. As groove 119 and the lugs 106 therein control the last transfer means, the periphery of said groove will determine the relative ratio of peripheral travel of the drum assembly 98 to the lineal travel of the outbearing conveyor 15. Thus, the greater portion of the peripheral distance in a counter clock-wise direction (to follow the direction of rotation indicated) of the grooves controlling the last transfer means, will have lugs 106 present to operate switch 127. On the other hand, a groove, as 104, operating the first transfer means will have only a relatively small portion of its periphery containing lugs 106 to operate the switch 120. If it is desired to reduce the number of lugs 106 which are needed, then means are provided to accelerate the return of the lugs in each groove into restrained position back of a particular catch 107. A form of such means to return lugs to their normal position after they have operated the switch associated with them comprises: arm 195 mounted for swinging movement about driven shaft 102 (see Figs. 5, 6 and 10).

The arm 195 carries at its outer end a catch 196. The catch 196 is pivoted to arm 195 and is spring loaded by spring 197 so that the catch 196 may assume and will be held in either the position shown in Fig. 6 or the position shown in Fig. 10. The catch 196 is preferably provided at its leading edge with a notched portion 198. Thus, when the catch 196 is in the position shown in Fig. 6, it will engage behind and be supported by lugs 106 when the arm 195 is traveling in a counter-clockwise direction as respects the showing in Figs. 6 and 10. In the path of travel of the arm 199 of catch 196 is a fixed stop 200. Thus when the arm 199 is urged against fixed stop 200, the catch 196 will angularly move in a clockwise direction until the arm 199 comes to rest against support 201 carried by arm 195. Each time the centers supporting the spring 197 pass beyond the center of the pivotal support of the catch 196, a toggle action obtains and the catch 196 will be held in either the position shown in Fig. 6 or the position shown in Fig. 10. When the arm 195 is angularly moved in a clockwise direction, arm 199 engages fixed stop 202 which angularly moves catch 196 out of its position shown in Fig. 10 to its position shown in Fig. 6.

The stop 202 for each of the grooves 104, 105 and 114 to 119 inclusive is positioned in a counter-clockwise direction from its switch means (one of 120 to 127 inclusive) a suitable distance so that each lug 106, being returned by an arm 195 and parts associated therewith, will have first operated its associated switch means before being returned. Thus the amount of angular movement of an arm 195 will depend upon the peripheral location of the switch means as respects a particular groove. The stop 202 for a particular groove will be located in close proximity to the switch operated by the lugs in a particular groove and the stop 200 will be located sufficiently remote from the catch means 107 associated with a particular groove so there will be enough space in a particular groove, as 104, to take care of the lugs 106 which will be normally restrained by a catch 107.

Each arm 195 is periodically oscillated between its stops 200 and 202 by any suitable means. The means shown for oscillating each arm comprise a gear 203 fixed to arm 195 and centered about shaft 102. The gear 203 meshes with rack 204. Rack 204 is mounted for reciprocating motion by plate 205 and rollers 206 mounted thereon. Each plate 205 is mounted for oscillating movement about shaft 102. Thus each assembly including plate 205 and rollers 206 will rock as the rack 204 supported thereby is reciprocated.

Each rack 204 is resiliently connected with its associated arm 207 and this may be accomplished by providing a tubular member 208 connected with the rack 204. Within the tubular member 208 is provided a compression spring 209 and a key hole slot 210 is provided in the tubular member 208. The arm 207 carries a cross pin 211 and the cross pin 211 may reciprocate in the slot 210 but movement in one direction will be resiliently restrained as will appear. Thus upon movement of the arm 207 toward the left, as viewed in Fig. 6, arm 207 will engage spring 209 which engages rack 204. Thus rack 204 will be moved to the left which in turn will rotate gear 203 in a counter-clockwise direction and motion in the same direction will be imparted to the arm 195. If there should be more lugs 106 in a slot restrained by a catch 107 than can be moved to their normal positions before arm 199 engages stop 200, then spring 209 will be compressed and arm 199 will continue to move until it engages fixed stop 200. Upon engagement of arm 199 with fixed stop 200, then catch 196 moves in a clockwise direction and the notched portion 198 thereof moves free of the lugs 106 and into the position indicated in Fig. 10.

Upon movement of arm 207 to the right, as viewed in Fig. 6, cross pin 211 will first move in slot 210 (if spring 209 has been compressed) and then will engage tubular member 208. This will move rack 204 to the right and provide clockwise movement of gear 203 and arm 195. The amount of such clockwise movement of an arm 195 will be adjusted in relation to the location of its associated fixed stop 202.

As a means to reciprocate each arm 207 the desired amount depending upon the location of the associated stop 202, we have indicated a plurality of levers 212 which are fixed on pivotally mounted cross shaft 213. The cross shaft 213 is oscillated by any suitable means as a pitman arm and crank comprising arm 214 eccentrically supported by wheel 215. Each lever 212 is provided with a key hole slot 216. Each arm 207 is pivotally connected with a lever 212 and by adjusting a pivotal connection 217 in a key hole slot 216, the amount of reciprocation of a particular arm 207 can be determined. The wheel 215 is connected with any suitable source of rotary motion as by shaft 218.

The lug return means illustrated in Figs. 5, 6 and 10 permits the employment of a fewer number of lugs 106 as their return from one of the switches 120 to 127 to a catch 107 is accelerated by such lug return mechanism.

In Figs. 1 to 10 inclusive, we have shown lugs 106 frictionally engaging grooves in wheels 103 so said lugs can be restrained or permitted to move with the wheel and operate associated switch means. In our invention, we are not limited to grooves nor to lugs of the specific shape best illustrated in Figs. 7, 8 and 9. Our invention comprises an endless track and lug means movable to and out of switch operation position. One modification is illustrated in Fig. 11 of the drawing.

In Fig. 11, a fragment of a wheel 219 is shown and a wheel 219 will replace each of the wheels 103. A flange 220 of suitable shape functions as a trackway and thus supplants the trackway illustrated in the form of grooves, as groove 104, of the previous figures. The lugs associated with the trackway 220, as illustrated in Fig. 11, comprise parts 221 and 222. Together they form an internal recess mating with the ring-like flange 220. The parts 221 and 222 form a lug member numbered generally as 223 and lug members 223 will have the same function as the lug members 106 of the previous figures. In other words, they will be released by catches 107 and travel with a wheel 219 and they will, after a time delay after being released, operate a switch means as switch means 120.

In order to provide for releasable lugs 223 and to provide for frictional adjustment between them and a wheel 219, we have shown a bolt 224, a recess 225 in part 222 and a compression spring 226 surrounding the shank 227 of the bolt 224 and disposed in the recess 225. The shank 227 passes through registered openings in the parts 221 and 222 and is held in adjusted position by lock nuts 228.

Preferably each of the switch 120 to 127 inclusive is held by adjustable means so that the relative position of a particular switch means around the periphery of the drum assembly 98 can be adjusted and predetermined. A form of such adjusting means may include brackets 229 which mounts switch 120 and bracket 230 which mounts switch 121. Each of the switches will have its separate bracket. The brackets, as bracket 229, are mounted on the shaft 102 and thus if the brackets are angularly moved on the shaft, the relative position of a switch peripherally of the drum assembly 98 may be determined. After a bracket 229 or 230 has been properly adjusted it can be connected to the main frame structure as by link 231 shown broken away. There will be a link 232 for the bracket 230 and a similar link for each of the remaining brackets.

The purpose of providing separate wheels 103 is so that suitable adjustable means, as brackets 229 and 230, may be employed in connection with the switches 120 to 127 inclusive. Separate wheels 103 are also provided in order that separate return lug means, illustrated in Figs. 5, 6 and 10, can be employed for each wheel.

While the lugs which are frictionally engaged to a trackway may take other forms than those illustrated in the drawings, it is believed sufficient to indicate some carried by grooves and some carried by flanges.

In our invention we have provided a plurality of controls where each control comprises an endless driven track means as a groove 104 or a circular flange 220. Next we have provided a plurality of lugs which frictionally engage the trackway as the lugs 106 or the lugs 223. Next we provide a restraining means for the lugs associated with each trackway. As an example of such restraining means, we have shown electrically operated catches 107. The catch means associated with each track means is individually operable and preferably each catch means is operated at the same time as a clipper knife, or other means, is operated at the same time as means providing an article of a given character, as 13″ wide stock. Thereafter the lugs travel with the trackway a distance corresponding in time duration to the lineal travel of a conveyor means to a transfer means. Thereupon the lugs operate any suitable switch mechanism which controls the operation of the transfer means. Thus material comprising pieces having different characteristics may be carried by a single conveyor and ejected or delivered from said conveyor at different locations by reason of previously released lug means.

Obviously changes may be made in the forms, dimensions and arrangements of the parts of our invention without departing from the principles thereof, the above setting forth only preferred forms of embodiment of our invention.

We claim:

1. A device of the class described comprising a driven endless track means; a plurality of lugs frictionally engaging said track means; selectively operable stop means normally in the path of travel of said lugs on said track means and mounted for selective movement out of the path of any of said lugs; and sorter control means operable by each of said lugs and disposed in predetermined spaced relation on said track means and in the path of travel of lugs on said track means, whereby the action of the sorter control means is in delayed synchronous relation with the operation of the selectively operable stop means.

2. A device of the class described comprising a driven endless circular track means, a plurality of lugs frictionally engaging said track means, selectively operable stop means normally in the path of travel of said lugs on said track means and mounted for selective movement out of the path of any of said lugs; and sorter control means operable by each of said lugs and disposed in predetermined spaced relation on said track means and in the path of travel of lugs on said track means, whereby the action of the sorter control means is in delayed synchronous relation with the operation of the selectively operable stop means.

3. A device of the class described comprising a driven drum having groove means providing an endless moving circular track means, a plurality of lugs frictionally engaging said track means; selectively operable stop means normally in the path of travel of said lugs on said track means and mounted for selective movement out of the path of any of said lugs; and sorter control means operable by each of said lugs and disposed in predetermined spaced relation on said track means and in the path of travel of lugs on said track means, whereby the action of the sorter control means is in delayed synchronous relation with the operation of the selectively operable stop means.

4. A device of the class described comprising a driven drum having groove means which are rectangular in section and which provide an endless track means; a plurality of lugs frictionally engaging said track means; selectively operable stop means normally in the path of travel of said lugs on said track means and mounted for selective movement out of the path of any of said lugs; and sorter control means operable by each of said lugs and disposed in predetermined spaced relation on said track means and in the path of travel of lugs on said track means, whereby the action of the sorter control means is in delayed synchronous relation with the operation of the selectively operable stop means.

5. A device of the class described comprising a driven conveyor means; clipper means operably disposed as respects material on said conveyor means and operable by electrical impulses to provide pieces of material of predetermined dimensions; a driven endless track means; a plurality of lugs frictionally engaging said track means; electrically and selectively operable stop means operable in synchronism with the said electrical impulses and positioned normally in the path of travel of each of said lugs on said track means and mounted for selective movement out of said path; and sorter control means operable by said lugs and disposed in predetermined spaced relation on said track means and in the path of travel of lugs on said track means, whereby the action of the sorter control means is in delayed synchronous relation with the operation of the selectively operable stop means.

6. A device of the class described comprising a driven endless track means; a plurality of lugs frictionally engaging said track means; electrically and selectively operable stop means normally in the path of travel of said lugs on said track means and mounted for selective movement out of the path of any of said lugs; and electrical switch means operable by each of said lugs and disposed in predetermined spaced relation on said track means and in the path of travel of lugs on said track means, whereby the action of the sorter control means is in delayed synchronized relation with the operation of the selectively operable stop means.

7. A device of the class described comprising a driven circular track means; a plurality of lugs frictionally engaging said track means; selectively operable stop means normally in the path of travel of said lugs on said track means and mounted for selective movement out of the path of any of said lugs; and adjustable sorter control means angularly movable about the axis of said circular track means, operable by each of said lugs, disposed in predetermined spaced relation on said track means and in the path of travel of lugs on said track means, whereby the action of the sorter control means is adjustable and in delayed synchronous relation with the operation of the selectively operable stop means.

8. A device of the class described comprising a driven endless track means; a plurality of lugs frictionally engaging said track means; selectively operable stop means normally in the path of travel of said lugs on said track means and mounted for selective movement out of the path of any of said lugs; sorter control means operable by each of said lugs and disposed in predetermined spaced relation on said track means and in the path of travel of lugs on said track means, whereby the action of the sorter control means is in delayed synchronous relation with the operation of the selectively operable stop means, and lug return means operable after the sorter control means to return lugs into close proximity to the said selectively operable stop means.

9. A device of the class described comprising a driven endless track means; a plurality of lugs frictionally engaging said track means; selectively operable stop means normally in the path of travel of said lugs on said track means and mounted for selective movement out of the path of any of said lugs; sorter control means operable by each of said lugs and disposed in predetermined spaced relation on said track means and in the path of travel of lugs on said track means, whereby the action of the sorter control means is in delayed synchronous relation with the operation of the selectively operable stop means, and lug return means angularly movable about the axis of said circular track means and operable after the sorter control means to return lugs into close proximity to the said selectively operable stop means.

10. A device of the class described comprising a driven endless track means; a plurality of lugs frictionally engaging said track means; said lugs each comprising two numbers resiliently urged toward the walls forming the track means; selectively operable stop means normally in the path of travel of said lugs on said track means mounted for selective movement out of the path of any of said lugs; and sorter control means operable by each of said lugs and disposed in predetermined spaced relation on said track means and in the path of travel of lugs on said track means, whereby the action of the sorter control means is in delayed synchronous relation with the operation of the selectively operable stop means.

11. A device of the class described comprising a driven endless track means; a plurality of lugs frictionally engaging said track means, each of said lugs having a surface inclined from its trailing end portion to its leading end portions; electrically controlled selectively operable stop means normally in the path of travel of any of said lugs on said track means and positioned to engage the forward end portion of a lug and when released to travel along said surface and engage the next following lug; and electrical switch means in the path of travel of said lugs and operated thereby, whereby said electrical switch means is in delayed response to said electrically controlled stop means.

12. A device of the class described comprising a driven endless track means; a plurality of lugs each comprising two pieces which are resiliently urged relatively to each other to frictionally engage each lug with said track means; electrically controlled selectively operable stop means normally in the path of travel of said lugs on said track means and mounted for selective movement out of the path of any of said lugs; and electric switch means in the path of travel of said lugs and operated thereby, whereby said electric switch means is in delayed response to said electrically controlled stop means.

13. A device of the class described comprising a driven endless track means; a plurality of lugs frictionally engaging said track means; selectively operable stop means normally in the path of travel of said lugs on said track means and mounted for selective movement out of the path of any of said lugs; control means in the path of travel of said lugs and operated thereby; and lug return means for moving lugs relative to the track means and toward the said stop means comprising an oscillating pusher member traveling at an accelerated rate as respects said track means.

14. A device of the class described comprising a driven endless track means; a plurality of lugs frictionally engaging said track means; selectively operable stop means normally in the path of travel of said lugs on said track means and mounted for selective movement out of the path of any of said lugs; control means in the path of travel of said lugs and operated thereby; and lug return means for moving lugs relative to the track means and toward the said stop means comprising an oscillating pusher member traveling at an accelerated rate as respects said track means, and engaging said lugs in its movement toward said stop means and passing over said lugs in its movement in the other direction.

15. A device of the class described comprising a driven endless circular track means; a plurality of lugs frictionally engaging said track means; selectively operable stop means normally in the path of travel of said lugs on said track means and mounted for selective movement out of the path of any of said lugs; control means in the path of travel of said lugs and operated thereby; and lug return means for moving lugs relative to the track means and toward the said stop means comprising an oscillating pusher member traveling in a circular path and at an accelerated rate as respects said track means.

HAROLD R. EVANS.
DALE L. SCHUBERT.

REFERENCES CITED

The following references are of record in the file of this patent:

UNITED STATES PATENTS

| Number | Name | Date |
|---|---|---|
| 1,528,227 | Spooner | Mar. 3, 1925 |
| 1,771,905 | Uher | July 29, 1930 |
| 2,394,558 | Miller | Feb. 12, 1946 |

Certificate of Correction

Patent No. 2,497,874 February 21, 1950

HAROLD R. EVANS ET AL.

It is hereby certified that errors appear in the printed specification of the above numbered patent requiring correction as follows:

Column 1, line 40, for "13, 26" read *13, 13, 26*; column 3, line 19, for the word "device" read *devices*; column 4, line 26, for "as inlet" read *an inlet*; line 72, after "As" insert *is*; column 6, line 25, for "relay" read *delay*; column 17, line 16, for "switch" read *switches*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*